United States Patent
Lee et al.

(10) Patent No.: US 10,306,113 B2
(45) Date of Patent: May 28, 2019

(54) CAMERA AND METHOD FOR MANUFACTURING THE CAMERA

(71) Applicant: HYUNDAI MOTOR COMPANY, Seoul (KR)

(72) Inventors: Jong Bok Lee, Suwon-si (KR); Gideok Kwon, Seoul (KR); HeeJin Ro, Seoul (KR)

(73) Assignee: Hyundai Motor Company, Seoul (KR)

( * ) Notice: Subject to any disclaimer, the term of this patent is extended or adjusted under 35 U.S.C. 154(b) by 32 days.

(21) Appl. No.: 15/371,902

(22) Filed: Dec. 7, 2016

(65) Prior Publication Data

US 2018/0084161 A1    Mar. 22, 2018

(30) Foreign Application Priority Data

Sep. 21, 2016    (KR) ........................ 10-2016-0120591

(51) Int. Cl.
| | | |
|---|---|---|
| H04N 5/225 | (2006.01) | |
| G02B 27/00 | (2006.01) | |
| B60R 11/04 | (2006.01) | |
| G02B 7/02 | (2006.01) | |

(52) U.S. Cl.
CPC ........... *H04N 5/2252* (2013.01); *B60R 11/04* (2013.01); *G02B 7/028* (2013.01); *G02B 27/0006* (2013.01); *H04N 5/2254* (2013.01)

(58) Field of Classification Search
None
See application file for complete search history.

(56) References Cited

U.S. PATENT DOCUMENTS

| | | | | |
|---|---|---|---|---|
| 2007/0201149 A1* | 8/2007 | Nishioka | ................ | B82Y 20/00 359/793 |
| 2008/0051735 A1* | 2/2008 | Measamer | ......... | A61B 1/00087 604/265 |
| 2009/0223447 A1* | 9/2009 | Hara | ........................ | C30B 25/00 118/708 |
| 2010/0165080 A1* | 7/2010 | Yamaguchi | ........ | A61B 1/00183 348/45 |
| 2012/0120298 A1 | 5/2012 | Chiu et al. | | |
| 2012/0143004 A1* | 6/2012 | Gupta | ................ | A61B 1/00096 600/117 |

(Continued)

FOREIGN PATENT DOCUMENTS

| | | |
|---|---|---|
| KR | 10-0777924 B1 | 11/2007 |
| KR | 10-0862247 B1 | 10/2008 |

(Continued)

OTHER PUBLICATIONS

Office Action issued in corresponding Korean Patent Application No. 10-2016-0120591, dated Oct. 19, 2017.

*Primary Examiner* — Mark T Monk
(74) *Attorney, Agent, or Firm* — Morgan, Lewis & Bockius LLP (57) ABSTRACT

A camera includes a lens part in which a lens is installed, a housing coupled to the lens part, and a substrate electrically coupled to the lens part, wherein the housing includes a metal compound, a heating-element groove is formed over one or more surfaces of the housing, and a heating element including a conductive material is disposed in the heating-element groove, and wherein the substrate includes a coupling part coupled with the heating element.

13 Claims, 6 Drawing Sheets

(56) References Cited

U.S. PATENT DOCUMENTS

| | | |
|---|---|---|
| 2013/0003010 A1 | 1/2013 | Yu |
| 2013/0107110 A1 | 5/2013 | Park et al. |
| 2013/0310644 A1* | 11/2013 | Ichimura ................ A61B 1/127 |
| | | 600/109 |
| 2014/0036081 A1 | 2/2014 | Lang et al. |

FOREIGN PATENT DOCUMENTS

| | | |
|---|---|---|
| KR | 10-2013-0135665 A | 12/2013 |
| KR | 10-2014-0134467 A | 11/2014 |

* cited by examiner

CAMERA AND METHOD FOR MANUFACTURING THE CAMERA

CROSS-REFERENCE TO RELATED APPLICATION

This application claims the benefit of Korean Patent Application No. 10-2016-0120591, filed on Sep. 21, 2016 with the Korean Intellectual Property Office, the disclosure of which is incorporated herein by reference.

TECHNICAL FIELD

Embodiments of the present disclosure relate to a camera and a method for manufacturing the camera, and more particularly to a camera in which heat wires are installed and a method for manufacturing the camera.

BACKGROUND

With the rapid development of vehicle industries and electronics industries, and the increasing number of luxury vehicles, a digital video recording (DVR) camera and a rear-view surveillance camera have been widely used in vehicles to assist in investigating an incident, as well as to prevent an occurrence of accidents and robbery cases.

Generally, the DVR camera and the rear-view surveillance camera are mounted to the exterior of the vehicle. If rain starts to fall or if a large difference in temperature between the interior and the exterior of the camera occurs, camera lenses can become fogged due to moisture or humidity. It is impossible for the conventional DVR camera and the rear-view surveillance camera to normally capture images when fog occurs on the camera lenses due to a temperature difference caused by a change in the weather, or between different temperatures.

In order to address the above-mentioned issues, technology for installing heating elements in vehicle cameras has recently been developed. For example, technology for removing moisture by the heat generated when a current flows in the heating elements connected to a vehicle battery has been disclosed in Korean Patent Registration No. 10-0862247.

The heating elements of the conventional vehicle camera have been designed to heat to a high temperature of about 200° C. using nichrome wires, such that such high heat unavoidably modifies peripheral materials located in the vicinity of the heating elements.

SUMMARY

It is an aspect of the present disclosure to provide a camera configured to form heating elements therein using a Laser Directing Structure (LDS) fabrication method, and a method for manufacturing the same.

It is another aspect of the present disclosure to provide a camera for generating heat using high frequency signals, and a method for manufacturing the same.

Additional aspects of the disclosure will be set forth in part in the description which follows and, in part, will be obvious from the description, or may be learned by practice of the disclosure.

In accordance with some aspects of the present disclosure, a camera includes a lens part in which a lens is installed, a housing coupled to the lens part, and a substrate electrically coupled to the lens part. The housing includes a metal compound, a heating-element groove is formed over one or more surfaces of the housing, and a heating element including a conductive material is located in the heating-element groove. The substrate includes a coupling part coupled to the heating element.

The housing may include: a resin including at least one of: polycarbonate (PC), polyamide (PA), and acrylonitrile-butadiene-styrene copolymer (ABS); and a metal oxide including at least one of: magnesium (Mg), chrome (Cr), copper (Cu), nickel (Ni), barium (Ba), iron (Fe), titanium (Ti), and aluminum (Al).

The housing may be formed by coating the base having the metal oxide over a surface formed of at least one of resin, glass, rubber or leather.

The heating element may be provided at one surface of the housing located close to the lens part.

The housing may include an accommodation part in which an accommodation hole including the lens part is formed; and the heating element may be provided at an inner circumference surface of the accommodation hole or an end part of the accommodation part.

The lens part may include a lens fixing part protruding outward of the housing, and a coupling part contained in the accommodation hole. The end part of the accommodation part may be in contact with the lens fixing part. The heating element may be provided at the end part of the accommodation part, and encloses the accommodation hole.

The housing may further include a main body to support the accommodation part. The heating element may be connected to a coupling part. The coupling part extends from the end part of the accommodation part toward a side surface of the accommodation part and a side surface of the main body, and is located at the substrate.

At least some parts of the substrate may be accommodated in the housing.

The substrate may provide a high-frequency radio frequency (RF) signal to the heating element through the coupling part.

The heating element may remove frost or moisture from the lens through convection.

The housing may be formed of an injection-molded material. The heating element may be incorporated with the housing.

A surface of the housing in which the heating-element groove is formed may include a curved surface or a discontinuous surface. The heating element may be provided at the curved surface or the discontinuous surface of the housing.

In accordance with some aspects of the present disclosure, a method for manufacturing a camera including a housing coupled to a lens part in which a lens is installed includes: preparing the housing including a metal compound or a metal oxide; forming a heating-element groove over one or more surfaces of the housing; and forming a heating element including a conductive material in the heating-element groove.

The heating-element groove may be formed by irradiating laser light to one surface of the housing.

The heating element may be formed by performing plating or deposition over the heating-element groove.

A metal seed may be exposed by laser light irradiated to the heating-element groove, and the heating element may be plated or deposited over the metal seed of the heating-element groove.

The housing may include an accommodation part in which some parts of the lens part is included, and the heating-element groove may be formed in an end part of the accommodation part contacting the lens part.

The lens part may include some parts of a substrate, and the heating-element groove may be formed along one surface of the housing so as to extend from the end part of the accommodation part toward the substrate.

The lens part may include some parts of a substrate. The housing may be formed by coating a base having a metal compound or metal oxide over a surface formed of at least one of resin, glass, rubber or leather.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

Reference will now be made in detail to the exemplary embodiments of the present disclosure, examples of which are illustrated in the accompanying drawings, wherein like reference numerals refer to like elements throughout.

The term "vehicle" to be described in the present disclosure may conceptually include a vehicle, a motorcycle, etc. For convenience of description and better understanding of the present disclosure, the embodiments of the present disclosure will hereinafter be described centering on the vehicle.

The term "vehicle" may include a vehicle including an engine, a hybrid vehicle including an engine and an electric motor, an electric vehicle including an electric motor, etc.

A Driver Assistance System (DAS) to be described in the present disclosure will hereinafter be referred to as an advanced driver assistance system (ADAS) or an advanced driver assistance apparatus (ADAS).

An advanced driver assistance system (ADAS) and a vehicle including the same according to various embodiments of the perspective will hereinafter be described.

A vehicle camera for ADAS may be a stereoscopic camera. The stereoscopic camera may include a plurality of cameras. Stereoscopic images captured by a plurality of cameras may be processed by the ADAS.

The ADAS including the stereoscopic camera may acquire front-view stereoscopic images of the vehicle from the stereoscopic camera, may detect disparity on the basis of the stereoscopic images, may detect objects based on at least one stereoscopic image on the basis of disparity information, and may continuously track object movement after detection of the object.

The ADAS may perform signal processing of the stereoscopic images received from the stereoscopic camera on the basis of computer vision, and may generate vehicle associated information.

The vehicle associated information may include may include vehicle control information for directly controlling the vehicle and advanced driver assistance (ADS) information for guiding a vehicle driver.

Figure 1:
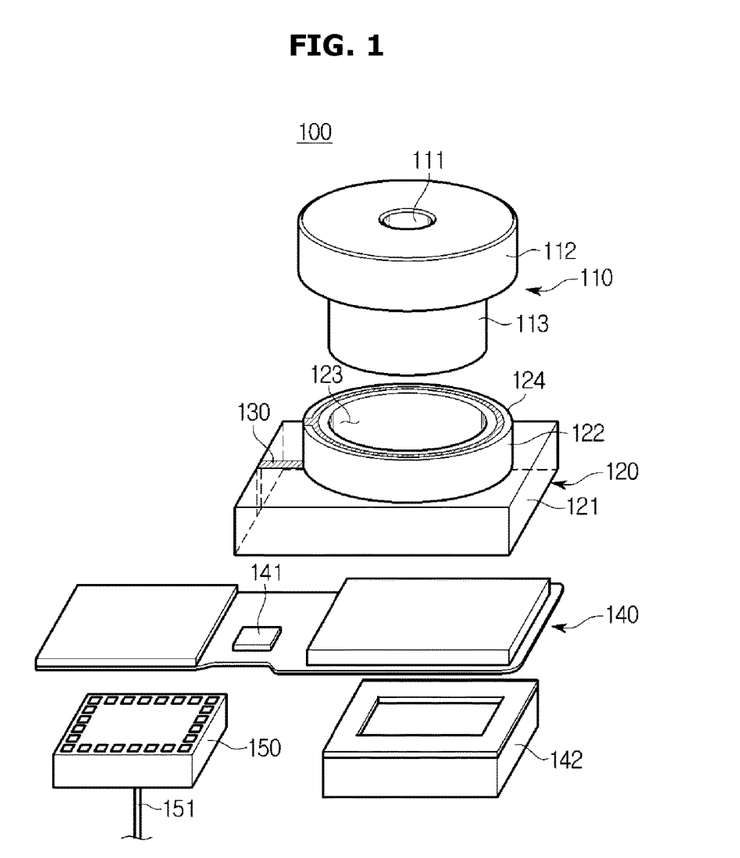
FIG. 1 is an exploded perspective view illustrating a vehicle camera according to exemplary embodiments of the present disclosure.

FIG. 1 is a structural view illustrating a vehicle camera 100.

FIG. 1 is an exploded perspective view illustrating a vehicle camera 100 according to exemplary embodiments of the present disclosure.

Referring to FIG. 1, the vehicle camera 100 may include a lens part 110 configured to include a lens 111 therein; a housing 120 coupled to the lens part 110; an image sensor 142 configured to sense an image on the basis of incident light from the lens 111; a substrate 140 configured to receive an image signal from the image sensor 142; and a connector 150 configured to emit an electrical signal of the substrate 140 to the outside, or to another device.

The lens part 110 may be detachably coupled to the housing 120. Although not shown in FIG. 1, the lens part 110 may be screwed onto the housing 120 or may be clipped or pressed into the housing 120.

The lens part 110 may include a lens fixing part 112 to which the lens 111 is fixed, and a coupling part 113 coupled to the housing 120. For example, the lens fixing part 112 may be formed in a large-diameter cylindrical shape, and the coupling part 113 may be formed in a small-diameter cylindrical shape. The lens fixing part 112 may protrude outward from the housing 120, and the coupling part may be contained in the housing 120.

The housing 120 may include an accommodation part 122 to accommodate the main body 121 and the lens part 110 therein. Although the main body 121 and the accommodation part 122 may be formed in different shapes and be distinguished from each other for convenience of description and better understanding of the present disclosure, the main body 121 and the accommodation part 122 are not distinguished from each other in shape.

The main body 121 may include at least some parts of the substrate 140. Although the main body 121 is configured to include some parts of the substrate 140 for convenience of description and better understanding of the present disclosure, the scope or spirit of the present disclosure is not limited thereto, and all the parts of the substrate 140 may also be contained in the main body 121.

The accommodation part 122 may include an accommodation hole 123 configured to include the coupling part 113 of the lens part 110. For example, the accommodation hole 123 may be formed in a cylindrical shape having an inner diameter corresponding to an outer diameter of the coupling part 113. In addition, assuming that the lens part 110 is coupled to the housing 120, the coupling part is contained in the accommodation hole 123 and the lens fixing part 112 may protrude outwardly from the accommodation part 122.

In addition, the end part of the accommodation part 122 may support the lens fixing part 112. For example, the end part of the accommodation part 122 may be formed in a ring shape.

The substrate 140 may be a printed circuit board (PCB). The substrate 140 may provide a current to drive the lens part 110, and may include an image processor configured to process an image signal received from the image sensor 142. The image processor may generate the disparity map and the RGB image on the basis of the images acquired by the image sensor 142. In this case, the generated RGB image may be a HDR (High Dynamic Range) image-based RGB image.

The substrate 140 may be arranged below the housing 120 and may be coupled to the housing 120. For example, the outer wall of the bottom surface of the housing 120 may protrude along the outer edge, and the substrate 140 may be coupled to the outer wall of the housing 120.

The substrate 140 may include a coupling part 141 electrically connected to the heating elements 130 of the housing 120 to transmit an electrical signal. A detailed description of the coupling part 141 and the heating elements 130 is as follows.

The vehicle camera 100 may receive a light (or optical) image of a target object from the lens 111, and may transmit the light image to an infrared (IR) filter (not shown). The IR filter may block infrared light from the received light image, and may irradiate the resultant light image to the image sensor 142. The image sensor 142 may convert the emitted light image into an electrical signal.

The image sensor 142 may be electrically coupled to the substrate 140 so as to receive a current from the substrate 140. The image sensor 142 may receive light having passed through the lens part 110, may convert the received light into an electrical signal, and may transmit the converted signal to the substrate 140.

The image sensor 142 may be arranged below the housing 120. Although the housing 120, the substrate 140, and the image sensor 142 are sequentially arranged as shown in FIG. 1, the order of the housing 120, the image sensor 142, and the substrate 140 may also be rearranged without departing from the scope or spirit of the present disclosure. For example, the outer wall of the housing 120 may protrude, resulting in a formation of the spacing between the housing 120 and the substrate 140. The image sensor 142 may be arranged in this spacing.

The connector 150 may be electrically coupled to the substrate 140 so as to output a current to the substrate 140. In addition, the connector 150 may be connected to an external control device (not shown) through a connection wire 151, and may output the electrical signal to the position between the external control device and the substrate 140. For example, the connector 150 may be arranged below the substrate 140.

The heating elements 130 contained in the housing will hereinafter be described in detail.

Figure 2:
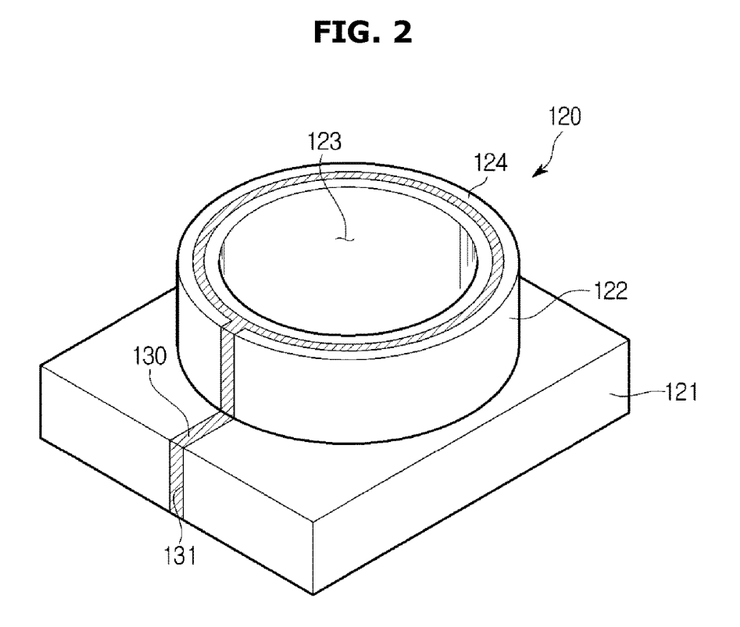
FIG. 2 is a perspective view illustrating a housing in which heating elements are installed according to exemplary embodiments of the present disclosure.
Figure 3:
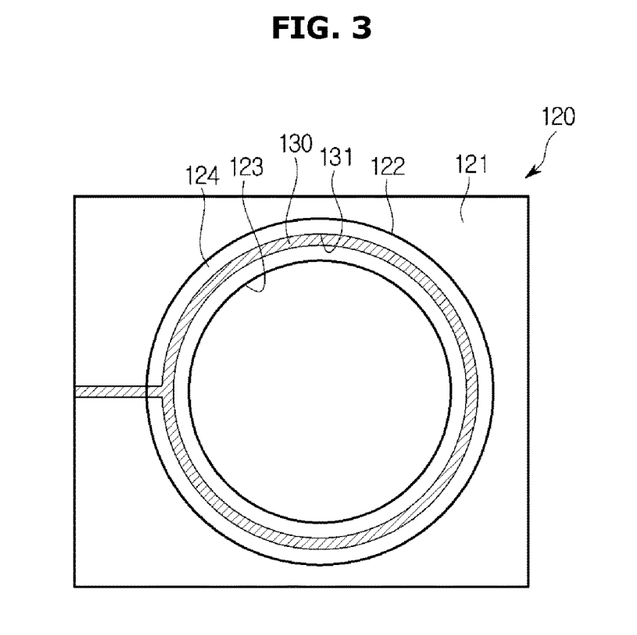
FIG. 3 is a plan view illustrating the housing of FIG. 2.
Figure 4:
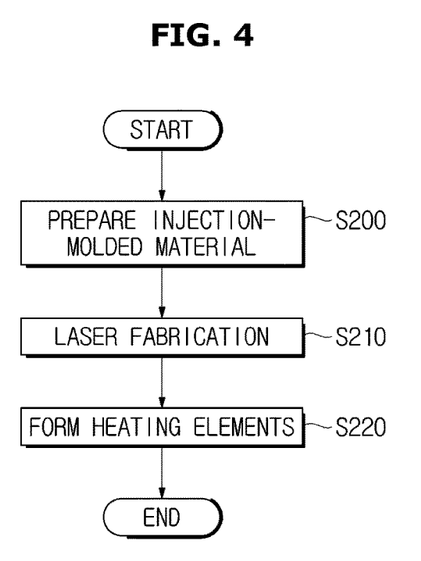
FIG. 4 is a flowchart illustrating a method for forming heating elements using an LDS fabrication method according to embodiments of the present disclosure.

FIG. 2 is a perspective view illustrating the housing 120 in which the heating elements 130 are installed. FIG. 3 is a plan view illustrating the housing 120 of FIG. 2. FIG. 4 is a flowchart illustrating a method for forming the heating elements 130 using an LDS fabrication method.

Referring to FIGS. 2 and 3, the heating elements 130 may be provided in the heating-element groove 131 formed in the housing 120.

The housing 120 may include the heating-element groove 131 inserted into one surface of the housing 120. Although the heating-element groove 131 is formed along the outer surface of the housing 120 for convenience of description, the heating-element groove 131 may also be formed in the inner surface of the housing 120 in a manner that the heating-element groove 131 is prevented from being exposed to the outside.

The heating elements 130 and the heating-element groove 131 may be formed in one surface of the housing 120 using the LDS fabrication method. A detailed description of the LDS fabrication method is as follows. The LDS fabrication method may construct a support member formed of a metal oxide material having nonconductive and chemically stable characteristics. In addition, during LDS fabrication, some parts of the support member are exposed to laser light such as UltraViolet (UV) laser or excimer laser, chemical combination of the metal oxide material is decomposed to expose a metal seed, and the support member is metalized, such that a conductive structure can be formed over the laser exposure part of the support member. Representative examples of such LDS fabrication methods have been disclosed in Korean Patent Registration No. 374667, Korean Patent Laid-Open Publication No. 2001-0040872, and Korean Patent Laid-Open Publication No. 2004-21614, the disclosures of which are incorporated herein by reference.

The heating elements 130 may be formed of a conductive material, for example, a metal material. The heating elements 130 may be formed of copper (Cu) or nickel (Ni) from among metals in consideration of conductivity and economics, and the scope or spirit of the present disclosure is not limited thereto. In addition, the heating elements 130 may also be formed of gold (Au).

The housing 120 may include a metal compound. For example, the housing 120 may be formed of a compound including a resin and a metal oxide. Here, the resin may include at least one of: polycarbonate (PC), polyamide (PA) and acrylonitrile-butadiene-styrene copolymer (ABS). The metal oxide may include at least one of magnesium (Mg), chrome (Cr), copper (Cu), barium (Ba), iron (Fe), titanium (Ti) and aluminum (Al).

Differently from FIG. 2, the base (not shown) including a metal compound may be coated over one surface of the housing 120. In this case, the heating-element groove 131 may be formed at one surface of the base.

The housing 120 may be formed of an injection-molded material. For example, the housing 120 may be formed by injection of a resin including a metal compound. The heating elements 130 may be incorporated with the housing 120. In this case, the heating elements 130 incorporated with the housing 120 may be formed by the irreversible method instead of the adhesive method.

The heating-element groove 131 may be formed by irradiating laser light to one surface of the housing 120. In this case, the housing 120 may be reduced (or deoxidized) into metal due to heat generated through groove formation.

In this case, the first and second bases (110, 130) may be reduced (or deoxidized) into metal due to heat generated through groove formation, and the part reduced to metal may form a metal seed in the heating-element groove 131.

The heating elements 130 may be plated over the heating-element groove 131. This plating process over the metal seed is well known to those skilled in the art, and as such a detailed description thereof will herein be omitted for convenience of description. Alternatively, the heating elements 130 may also be formed by a deposition process. Alternatively, the heating elements 130 may also be formed by combining the plating process with the deposition process. For convenience of description and better understanding of the present disclosure, the following description may assume that the heating elements 130 are generally formed by the plating process.

The heating elements 130 may include a copper (Cu) plating layer, and may plate the copper (Cu) plating layer with nickel (Ni), such that the first and second sense patterns (120, 140) can be antioxidation-processed. In addition, assuming that gold (Au) plating is used, conductivity of the heating elements 130 can be increased.

Meanwhile, the housing 120 may be formed by coating a base including a metal oxide material over one surface of a basic (or parent) material (not shown) formed of various substances. The basic material may include resin, glass, rubber, leather or the like. The basic material may be formed to have a stiff or elastic surface. In addition, the basic material may be hardened so that the basic material becomes rigid or flexible. The basic material may be formed by injection molding. For example, the basic material may be injection-molded and formed in various shapes. In addition, the first and second bases (110, 130), each of which includes a metal oxide material, may be coated over one surface of the basic material.

The housing 120 may include a discontinuous surface including a curved surface or a sharply broken surface. The heating-element groove 131 and the heating elements 130 may be formed over the curved surface or the sharply broken surface. In this case, since the heating-element groove 131 is formed by laser light and the heating elements 130 are formed by plating or the like, the heating elements 130 having a complicated shape may be formed irrespective of the shape of the housing 120.

The heating elements 130 may be plated over the heating-element groove 131. In this case, the heating elements 130 may be plated irrespective of the shape of the heating-element groove 131 according to characteristics of the plating process. The heating elements 130 can be easily plated over the heating-element groove 131 even when the heating-element groove 131 is not formed in a straight or planar shape.

A method for forming the heating elements 130 using the LDS fabrication method will hereinafter be described with reference to FIG. 4.

The housing 120 may be formed by injection molding (S200). The housing 120 may be formed by injection molding of a metal compound, or may be formed by coating the metal compound over one surface formed of resin, glass, rubber or leather.

The heating-element groove 131 may be formed by irradiating one surface of the housing 120 with laser light (e.g., UV laser or excimer laser) (S210). In this case, heat generated by groove formation may decompose chemical bonds of the metal compound so that the metal compound is reduced into metal, resulting in formation of a metal seed in the heating-element groove 131.

The heating elements 130 may be formed by metalizing the heating-element groove 131 by which the metal seed is exposed (S220). The metallization process may be carried out by plating or deposition.

Meanwhile, the heating elements 130 may be electrically coupled to the coupling part 141 located on the substrate 140. The coupling part 141 may be formed of a conductive material, for example, a metal.

The heating elements 130 may be formed of copper (Cu) or nickel (Ni) from among metals in consideration of conductivity and economics, and the scope or spirit of the present disclosure is not limited thereto. However, the coupling part 141 may also be formed of a metal material, such as copper (Cu), nickel (Ni) or gold (Au).

In addition, the coupling part 141 may be formed by LDS fabrication. For example, the base including the metal compound may be coated over one surface of the substrate 140, or the substrate 140 may include the metal compound therein. A groove in which the coupling part 141 is formed may be formed by laser light, and the coupling part 141 may be formed by plating or deposition.

The operation for generating heat from the heating elements 130 will hereinafter be described.

The vehicle camera 100 according to exemplary embodiments may perform defrosting using high-frequency heating elements. In more detail, for heat emission, radio frequency (RF) power having a specific frequency (e.g., 100 kHz) may be applied to a heating-element electrode. In the case of using a high frequency of about 100 kHz, heat may not be directly applied to the housing 120 or the lens part 110, and a temperature of the peripheral part of the lens 111 increases due to convection, such that moisture or frost can be removed from the lens 111. Therefore, although high heat is generated, modification of the housing 120 or the lens part 110 is prevented.

Figure 5:
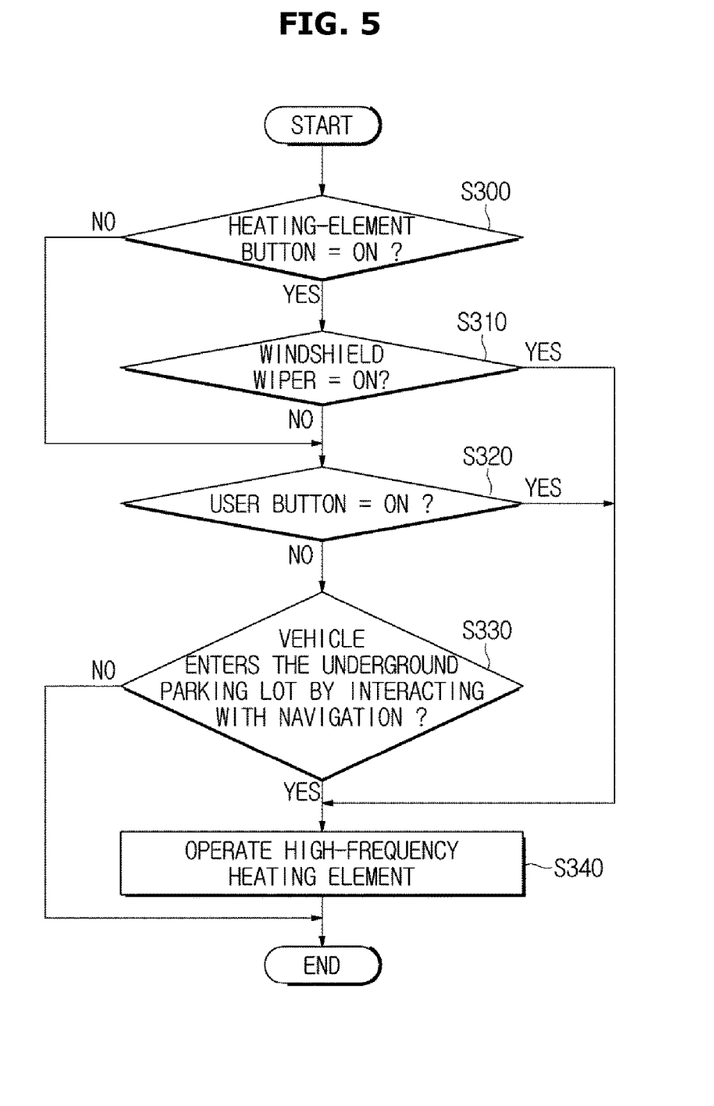
FIG. 5 is a flowchart illustrating a method for operating the heating elements of a vehicle camera according to exemplary embodiments of the present disclosure.

FIG. 5 is a flowchart illustrating a method for operating the heating elements of a vehicle camera 100 according to exemplary embodiments of the present disclosure.

Heating elements of the vehicle camera 100 may operate in various conditions. Three heating-element operational conditions are shown in FIG. 5.

In accordance with the first heating-element operational condition, assuming that the heating-element button is switched on and the user operates a windshield wiper, this means that the external part of the vehicle is at a high-humidity state and the viewing region of the camera is fogged, such that the heating elements may operate. Here, the heating-element button may be a button to operate the heating elements installed at the windshield, or may be a button to operate the heating elements installed at the camera.

In more detail, it is determined whether the heating-element button is operated (S300). If the heating-element button is operated (S300), it is determined whether the windshield wiper is operated (S310). If the windshield wiper is operated (S310), the high-frequency heating elements are operated to perform defrosting (S340). If the defrosting process is completed, the entire control process may be finished.

In this case, the order of the operation state decision (S300) of the heating-element button and the operation state decision (S310) of the windshield wiper may also be changed to the opposite order without departing from the scope or spirit of the present disclosure. That is, assuming that the windshield wiper is operated and the heating-element button is operated, high-frequency heating elements are operated to perform defrosting (S340). If the defrosting process is completed, the entire control process may be finished.

Assuming that the heating-element button is not operated, the heating-element button is operated, and the windshield wiper is not operated, it may be determined whether the other condition for the heating-element operation is satisfied. In some embodiments, assuming that the windshield wiper is not operated or the heating-element button is not operated whereas the windshield wiper is operated according to the decision order, it may be determined whether the other condition for the heating-element operation is satisfied, or the control processing may be finished.

In accordance with the second heating-element operational condition, assuming that the user button is switched on, this means that the external part of the vehicle is at a high-humidity state and the viewing region of the camera is fogged, such that the heating elements may operate. Here, the user button may be a button to operate the heating elements installed at the camera. In other words, the user may operate the user button such that the user may directly operate the heating elements of the camera.

In more detail, it is determined whether the user button is operated (S320). If the user button is operated (S320), high-frequency heating elements are operated to perform defrosting (S340). If the defrosting process is completed, the entire control process may be finished.

If the user button is not operated, it is determined whether the other condition for the heating-element operation is satisfied, or the entire control process may be finished.

In accordance with the third heating-element operational condition, assuming that the vehicle position interacts with a navigation device and the vehicle enters an underground parking lot on the basis of information displayed on the navigation device, this means that the external part of the vehicle is at a high-humidity state and the viewing region of the camera is fogged, such that the heating elements may operate. In other words, even when the user does not operate a separate button, it is determined that the viewing region of the camera is fogged, such that the heating elements of the camera may be directly operated. The reason why the heating elements of the camera are operated is that there is a high possibility that a large amount of frost, or fog, occurs by a high difference in temperature when the vehicle enters the underground parking lot.

In some embodiments, not only when the vehicle enters the underground parking lot, but also when a high-humidity state is decided by an output signal of the rain sensor, the camera heating-elements may also operate. That is, assuming that a high-humidity state is decided by the output signal of the rain sensor and the vehicle enters the underground parking lot on the basis of information displayed on the navigation device, the heating-elements of the camera may operate.

In some embodiments, not only when the vehicle enters the underground parking lot, but also when the heating-element button is operated, the camera heating-elements may also operate. That is, when the heating-element button is operated and the vehicle enters the underground parking lot on the basis of information displayed on the navigation device, the camera heating-elements may operate.

In more detail, it is determined whether the vehicle enters the underground parking lot when interacting with the navigation device (S330). If the vehicle enters the underground parking lot (S330), high-frequency heating elements are operated to perform defrosting (S340). If the defrosting process is completed, the entire control process is finished.

If the vehicle does not enter the underground parking lot, it is determined whether the other condition for the heating-element operation is satisfied, or the entire control process may be finished.

Meanwhile, the order of deciding three three-element operational conditions of FIG. 5 may be changed as necessary.

Figure 6:
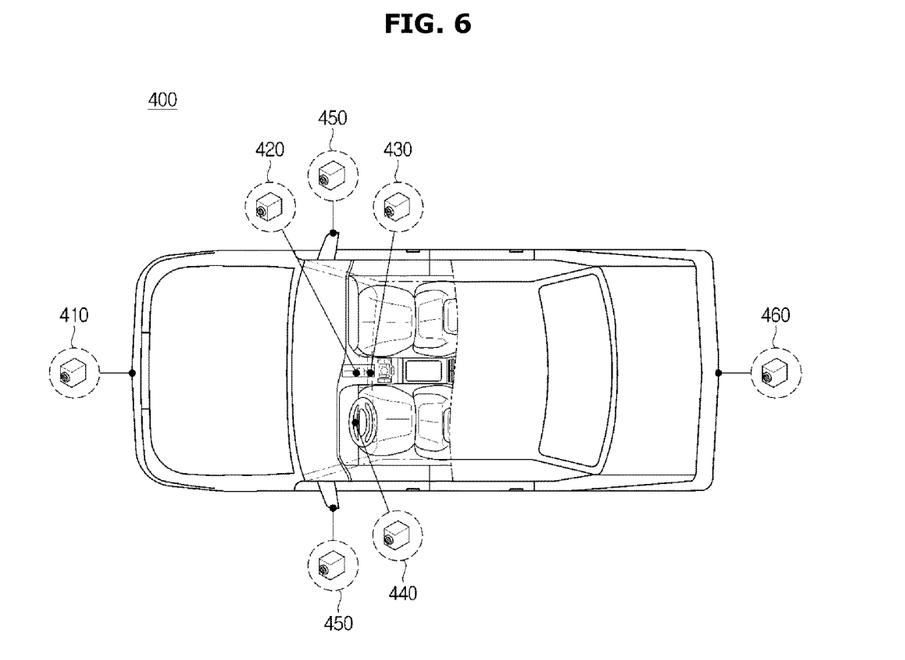
FIG. 6 is a view illustrating exemplary installation positions of vehicle cameras according to exemplary embodiments of the present disclosure.

FIG. 6 is a view illustrating exemplary installation positions of the vehicle cameras 100 according to exemplary embodiments of the present disclosure.

Referring to FIG. 6, a vehicle camera 410 may be installed at the front bumper to collect front-view images of the front bumper. A vehicle camera 460 may be installed at the rear bumper to collect rear-view images of the rear bumper. Vehicle cameras 450 may be installed at the side-view mirrors to collect side-view images of the vehicle. A vehicle camera 440 may be installed at the steering wheel to collect a driver's state image. A vehicle camera 420 may be installed in a forward direction of the windshield so that the vehicle camera 420 may collect front-view images of the vehicle. A vehicle camera 430 may be installed in a backward direction of the windshield so that the vehicle camera 430 may collect images indicating the driver's operation.

As is apparent from the above description, since the vehicle camera and the method for manufacturing the same according to exemplary embodiments is manufactured using a Laser Directing Structure (LDS) fabrication method, the manufacturing process is simplified and production costs are reduced.

Even when the camera housing has a curved surface or complicated shape, heating elements can be easily formed in the vehicle camera.

Since laser fabrication is used, heating-element grooves, each of which has the size of about 50 micrometers or less, can also be formed in small-sized components.

Since adhesive processing is not used to form heating elements in the camera housing, the camera housing can be protected from vibrations and impacts, resulting in increased durability of the camera housing.

The vehicle camera is manufactured in a high-temperature situation caused by laser irradiation. Although the manufactured products are used at a high temperature, reliability of the manufactured products can be improved.

The heating elements are incorporated with an injection-molded material, such that a total weight of the manufactured product is not, or is only minimally, increased.

Heat is generated by high-frequency heating, such that no modification occurs in the lens part or the lens housing.

Although some exemplary embodiments of the present disclosure have been shown and described, it would be appreciated by those skilled in the art that changes may be made in these embodiments without departing from the principles and spirit of the disclosure, the scope of which is defined in the claims and their equivalents.

What is claimed is:

1. A camera, comprising:
a lens part in which a lens is installed;
a housing coupled to the lens part; and
a substrate electrically coupled to the lens part,
wherein the housing, which is made of a metal compound, includes:
a heating-element groove on one or more surfaces of the housing; and
a heating element, which includes a conductive material, disposed in the heating-element groove,
wherein the substrate includes a coupling part coupled with the heating element, and
wherein the one or more surfaces of housing on which the heating-element groove is disposed includes a surface of the housing located adjacent the lens part.

2. The camera according to claim 1, wherein the housing includes a resin including at least one of polycarbonate (PC), polyamide (PA) and acrylonitrile butadiene styrene copolymer (ABS), and a metal oxide including at least one of magnesium (Mg), chrome (Cr), copper (Cu), nickel (Ni), barium (Ba), iron (Fe), titanium (Ti) and aluminum (Al).

3. The camera according to claim 2, wherein the housing is formed by coating a base having the metal oxide over a surface formed of at least one of resin, glass, rubber and leather.

4. The camera according to claim 1, wherein the heating element is provided at one surface of the housing located close to the lens part.

5. The camera according to claim 4, wherein the housing includes an accommodation part in which an accommodation hole including the lens part is formed; and
the heating element is provided at an inner circumference surface of the accommodation hole or an end part of the accommodation part.

6. The camera according to claim 5, wherein the lens part includes a lens fixing part protruding outward of the housing, and a coupling part contained in the accommodation hole;

the end part of the accommodation part is in contact with the lens fixing part; and     the heating element is provided at the end part of the accommodation part, and encloses the accommodation hole.

7. The camera according to claim 6, wherein the housing further includes a main body to support the accommodation part, and     wherein the heating element is connected to a coupling part, which extends from the end part of the accommodation part toward a side surface of the accommodation part and a side surface of the main body, and is located at the substrate.

8. The camera according to claim 1, wherein at least some parts of the substrate are accommodated in the housing.

9. The camera according to claim 1, wherein the substrate provides a high-frequency radio frequency (RF) signal to the heating element through the coupling part.

10. The camera according to claim 9, wherein the heating element removes frost or moisture from the lens through convection.

11. The camera according to claim 2, wherein the housing is formed of an injection-molded material; and     the heating element is included with the housing.

12. The camera according to claim 1, wherein a surface of the housing in which the heating-element groove is formed includes a curved surface or a discontinuous surface; and     the heating element is provided at the curved surface or the discontinuous surface of the housing.

13. The camera according to claim 1, wherein the camera is used for vehicle.

* * * * *